US005106686A

United States Patent [19]

Wade, Jr. et al.

[11] Patent Number: 5,106,686

[45] Date of Patent: Apr. 21, 1992

[54] MULTILAYER WRAPPED INSULATED MAGNET WIRE

[75] Inventors: Ivan W. Wade, Jr., Fort Wayne, Ind.; John D. Hessler, Payne, Ohio; Harry E. Eloph, Fort Wayne, Ind.

[73] Assignee: Essex Group, Inc., Fort Wayne, Ind.

[21] Appl. No.: 190,197

[22] Filed: May 4, 1988

Related U.S. Application Data

[62] Division of Ser. No. 84,367, Aug. 12, 1987, Pat. No. 4,851,060.

[51] Int. Cl.[5] .......................... D02G 3/00; B32B 16/00

[52] U.S. Cl. .................................... 428/377; 428/379; 428/383; 428/401; 174/110 SR; 174/120 SR

[58] Field of Search ................. 174/120 SR; 428/375, 428/377, 379, 383, 910, 212

[56] References Cited

U.S. PATENT DOCUMENTS

| | | | |
|---|---|---|---|
| 3,657,008 | 4/1972 | Gleim | 428/383 |
| 4,091,150 | 5/1978 | Roelofs | 428/910 |
| 4,131,714 | 12/1978 | Karkoski | 428/379 |
| 4,624,718 | 11/1986 | Hessler et al. | 156/56 |
| 4,761,520 | 8/1988 | Wade, Jr. | 174/121 R |
| 4,851,060 | 7/1989 | Wade, Jr. | 428/378 |
| 4,868,035 | 9/1989 | Weinberg et al. | 428/212 |

FOREIGN PATENT DOCUMENTS

| | | | |
|---|---|---|---|
| 0026006 | 4/1981 | European Pat. Off. | 428/910 |

*Primary Examiner*—George F. Lesmes
*Assistant Examiner*—Jill M. Coray
*Attorney, Agent, or Firm*—Allegretti & Witcoff, Ltd.

[57] ABSTRACT

Magnet wire substrates (1) are described having a layer of polyester tape (2) wrapped thereon, including a layer of spirally wrapped and bonded polyester insulation tape (3) as the outermost layer. The two tape layers are made up of amorphous (4) and crystalline (5) segments unbonded to the wire and bonded to each other to provide the requisite electrical properties and improved physical properties including increased flexibility and ease of strippability. A single multilayer polyester insulation tape can also be used with similar properties and reduced thickness.

12 Claims, 1 Drawing Sheet

MULTILAYER WRAPPED INSULATED MAGNET WIRE

This is a division of copending application Ser. No. 084,367 filed on Aug. 12, 1987, now U.S. Pat. No. 4,851,060.

DESCRIPTION

1. Technical Field

The field of art to which this invention pertains is insulated electrical conductors, and specifically insulated magnet wire.

2. Background Art

Insulated magnet wires are primarily used to form coils that create magnetic fields within electrical devices. The majority of these magnet wires have electrical insulation which is bonded to the conductor. This bonded insulation provides toughness to the coated wire but does present other problems.

In use it is necessary to strip the insulation from the wire, for example to connect the wire to the source of electrical energy or to additional electrical components. The added costs and labor to remove this material is tolerated by users because of the desirable toughness imparted to the wires by the bonded coating.

Accordingly, what is needed in this art, is an insulated conductor which provides the required electrical and physical properties, but is readily removable in use.

DISCLOSURE OF INVENTION

An electrically insulated magnet wire substrate is disclosed comprising a metallic conductor with a nonbonded layer of multilayer polyester insulation tape wound thereon. The resulting insulated magnet wire, in addition to having excellent physical and electrical properties, has superior flexibility properties and easily removable insulation.

Another aspect of the invention is an electrically insulated magnet wire substrate comprising a metallic conductor with a plurality of nonbonded layers of multilayer polyester insulation tape wound thereon. The resulting insulated magnet wire, in addition to having excellent physical and electrical properties, has superior flexibility properties and easily removable insulation.

Another aspect of the invention is a method of making the electrically insulated magnet wire substrates by overwrapping the metallic conductor with the polyester insulation tape. The tape is wound around the electrical conductor circumferentially with adjacent turns overlaping or abutting. One side (outer surface) of the multilayer tape contains a layer of polyester in amorphous form and the other side (inner surface) of the tape contains a layer of polyester in crystalline form. The tape is wrapped on the conductor with the crystalline form contacting the conductor. After such wrapping the wire is heated to melt the polyester material also causing the amorphous layers to become crystalline and bond to the crystalline (inner) overwrapped surface.

Another aspect of the invention is a method of making the electrically insulated magnet wire substrates by overwrapping the metallic conductor with the double layer polyester insulation tape. The tape is wound around the electrical conductor circumferentially with adjacent turns overlapping or abutting. Over the first tape layer is spirally wrapped the second multilayer polyester insulation tape. One side (outer surface) of the multilayer tapes contain a layer of polyester in amorphous form and the other side (inner surface) of the tapes contain a layer of polyester in crystalline form. The first tape is wrapped on the conductor with the crystalline form contacting the conductor. The second tape is wrapped on the first tape so that the amorphous form sides of both tapes are in contact. After such wrapping the wire is heated to melt the polyester material also causing the amorphous layers to bond to each other and become crystalline.

Another aspect of the invention is an improved method for connecting wires from the source of electrical energy to an electrical component, or connecting electrical components together, by stripping insulation from a portion of the wire to make the connection followed by making the connection through mechnical or solder means. By utilizing the wires described above the stripping process is greatly reduced in time, expense, and energy.

The foregoing and other features and advantages of the present invention will become more apparent from the following description and accompanying drawing.

BEST MODE FOR CARRYING OUT THE INVENTION

Figure 1:
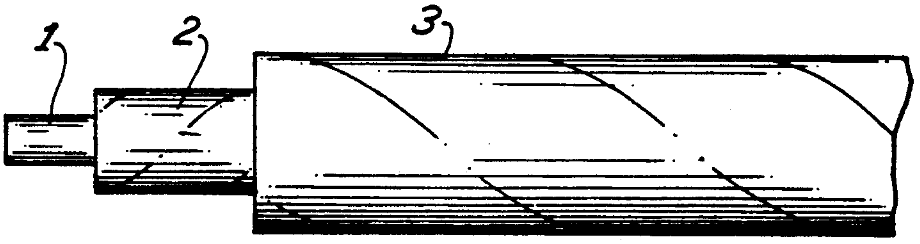
FIG. 1 demonstrates a spirally wrapped wire according to the present invention.

The electrical conductors (1) to be insulated with the tape are conventional conductors in this art and can be either circular, square, or rectangular in cross section, or even hollow (for example for use in waveguides). In addition to solid metal substrates, stranded wires, for example as in cable material, can also be used as the conductor in the present invention.

The wire is generally copper or aluminum and ranges anywhere from 20 mils to 460 mils in diameter, with wires 64 mils to 325 mils in diameter being the most commonly treated wires according to the present invention. Typically for circular cross-section wire 20 gauge (American Wire Gauge) to 1/0 gauge are used, for square cross-section wire 14 gauge to 1/0 gauge, and for retangular cross-section wire, wires 25 to 325 mils thick by 50 mils to 700 mils wide are used. And while the wires are typically bare, i.e. no prior applied insulation material, wires with conventional insulation polymeric coatings (e.g. polyester, polyamide, polyamideimide, etc.—see commonly assigned U.S. Pat. Nos. 4,290,929; 4,374,221; 4,471,022; and 4,476,279, the disclosures of which are incorporated by reference) already applied can also be used according to the present invention.

The polyester can be any electrical grade polyester with one special requirement. The polyester must be multilayer and have an inner surface to go against the metal conductor which is in crystalline form and an outer surface which is in amorphous form. Such material is available from Sterling Paper Company (Seymour, Conn.) as their designation number 809 or 809M. Typically this tape is a polyethylene terephthalate 0.0006 inch to 0.005 inch thick (with 1.2 mil preferred) and 0.25 inch to 1.0 inch wide (with 0.75 inch preferred). As shown in FIG. 2, the crystalline side (5) of the first tape (2) is wrapped against the conductor (1), the amorphous sides (4) of both tapes (2 and 3) are face-to-face, and the crystalline side (5) of the second tape (3) in the outermost layer. The first tape may be wrapped on the conductor and the second tape on the first tape by abutting the respective edges or with a degree of overlap. Typically overlapping of 10% to 75% based on the lower layer is performed, with an approximately 50% overlap preferred. Conventional dual head taping machines such as are available from U.S. Machinery Company may be used for the wrapping operation. Magnaply TM tape packing can also be used. While the polyester tapes can be wrapped in the same directions, typically the polyester tapes are wrapped in opposite directions (note FIG. 1). This cross laying provides better physical properties than laying in the same direction. The amorphous portion of the multilayer tape typically represents 10% to 50% of the overall thickness of the tape and more typically 20% to 40%.

Figure 2:
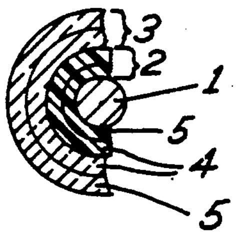
FIG. 2 demonstrates a cross-section of the wire prior to heat treatment.

For that embodiment where only a single multilayer tape is used, the configuration would be as shown in FIG. 1 with the elimination of layer 3.

After applying the polyester layers, the wrapped wire is heated in any conventional heating equipment which can provide fast, controllable heating, such as radiant or air heaters or induction heaters manufactured by Lepel Corporation (New York), or Robotron (Michigan). The heating is controlled so as to affect proper fusing of the polyester layers to each other, causing the amorphous layers to become crystalline, and become bonded to each other while preventing degradation of the film and minimal shrinkage. In the case of two multilayer tapes, the heating would cause the heating to bond to each other. In the case of the single multilayer tape the amorphous layer would bond to the crystalline layer it would be contacting. Typically, for example, for the Sterling type tapes described above, the temperatures of the coated wire reaches 220° F. to 400° F., and preferably 280° F. to 320° F., for a fraction of a second up to about 1.5 minutes.

EXAMPLE

A 5.5 gauge (American Wire Gauge) round copper wire was wrapped using U.S. Machinery Company serving equipment with multilayer polyester film provided by from Sterling Paper Company under the designation 809M. The polyester film was 1.2 mils thick and was overlapped 50%. This same U.S. Machining Company taping equipment was used to apply a second layer of the same tape with the same overlap in a direction opposite that used to wrap the first tape layer with amorphous sides touching as shown in FIG. 2. The thus wrapped wire was passed through an induction heater to fuse the material and provide a smooth coating. The induction heater raised the temperature of the copper wire to 300° F. for up to 1.33 seconds. This was sufficient to fuse the tape layers to each other without drying out or shrinking the tape material. The resulting material had a smooth, slippery coat, which was easily removable.

In addition to the easy removability (for example, using a conventional cutting tool to cut the tape and removing with the fingers) of the insulation of the magnet wire according to the present invention, the wire has excellent physical properties such as toughness, (winding machine toughness), abrasion resistance, a low coefficient of friction (lubricity), etc. In addition it has good electrical properties such as high dielectric strength and high corona resistance. It compares favorably with paper wrapped insulation in electrical properties with improved physical properties. The single multilayer tape wrap also had the advantage of having electrical properties and thickness approaching that of film coated magnet wire with much improved strippability. Compared to such film coated wire this would eliminate the need for highly toxic chemical strippers or brush removers which produce dust and remove the conductor, e.g. copper.

Such wire has utility, for example, in motors in general, in transformer windings, in field armatures for motors, coils in general, generators in general, open motors, etc. The wire is particularly able to withstand winding abuse insertion into motors, and has thermal stability and increased flexibility (tighter radius bending without rupture).

Although the invention has been shown and described with respect to detailed embodiments thereof, it will be understood by those skilled in the art that various changes in form and detail thereof may be made without departing from the spirit and scope of the invention.

We claim:

1. An electrically insulated wire comprising a metallic conductor having a multilayer polyester tape wrapped thereon in an overlapping fashion, the polyester tape having an amorphous surface and a crystalline surface with the crystalline surface being in contact with the metallic conductor prior to heating the polyester tape, the resulting insulated wire having high physical and electrical insulation properties, increased flexibility, and ease of stripability of the polyester tape.

2. An insulated electrical conductor comprising:

an electrical conductor; and at least one layer of electrical insulation, wherein the electrical insulation is formed by heating a multilayer insulation tape having an amorphous surface and a crystalline surface, the tape being positioned around the electrical conductor in an overlapping fashion with the crystalline surface being in contact with the electrical conductor, the overlapping amorphous and crystalline surfaces being bonded together so that the resulting insulated conductor electrical exhibits excellent flexibility.

3. An electrically insulated conductor comprising a metallic conductor having a first layer of multilayer polyester tape wrapped thereon in an abutting or overlapping fashion, the first layer of polyester tape having spirally wrapped thereon a second layer of polyester tape, both the first and second layers of polyester tape each having an amorphous and a crystalline surface with the first layer having the crystalline surface in contact with the metallic conductor and the amorphous surfaces of the first and second layers of polyester tape being in contact with each other, the two amorphous surfaces being fused together upon heating with the resulting insulated wire having high physical and electrical insulation properties, increased flexibility and ease of stripability of the polyester tape.

4. The insulated electrical conductor of claim 3 wherein the bond between the amorphous and crystalline surfaces is achieved by heating the insulation tape to a temperature such that the amorphous portions become crystalline but not to a temperature to cause the insulation tape to degrade and shrink.

5. The insulated electrical conductor of claim 3 wherein the bond between the amorphous and crystalline surfaces is achieved by heating the insulation tape to a temperature not exceeding 320° F., such that the amorphous surfaces become crystalline and fuse together.

6. The insulated electrical conductor of claim 5, wherein the insulation tape further comprises: polyethylene terephthalate.

7. The insulated electrical conductor of claim 6 wherein the tape is about 0.0006 to about 0.005 inches thick.

8. The insulated electrical conductor of claim 6 wherein the tape is about 0.25 to about 1.0 inch wide.

9. The insulated electrical conductor of claim 8 wherein the tape is 0.75 inches wide.

10. The insulated electrical conductor of claim 6 wherein the tape is 1.2 mils thick.

11. The insulated electrical conductor of claim 5 wherein the amorphous surface is from about 10% to about 50% of the overall thickness of the insulation tape.

12. The insulated electrical conductor of claim 5 wherein the amorphous surface is from about 20% to about 40% of the overall thickness of the insulation tape.

* * * * *